US006986402B2

(12) United States Patent
Hedley et al.

(10) Patent No.: US 6,986,402 B2
(45) Date of Patent: Jan. 17, 2006

(54) ACCESS DEVICE

(75) Inventors: Robert Ian Hedley, Milbrodale via Singleton (AU); Christopher Nash Whybin, Banxton (AU)

(73) Assignee: Justoy Pty Ltd., New South Wales (AU)

( * ) Notice: Subject to any disclaimer, the term of this patent is extended or adjusted under 35 U.S.C. 154(b) by 0 days.

(21) Appl. No.: 11/095,252

(22) Filed: Mar. 31, 2005

(65) Prior Publication Data

US 2005/0167196 A1    Aug. 4, 2005

Related U.S. Application Data

(63) Continuation of application No. 10/315,331, filed on Dec. 10, 2002, now abandoned, which is a continuation-in-part of application No. 09/513,730, filed on Feb. 24, 2000, now abandoned.

(51) Int. Cl.
*B60R 3/00* (2006.01)
(52) U.S. Cl. .......................... 182/95; 182/97; 182/127; 280/166
(58) Field of Classification Search ............ 182/83–86, 182/93–97; 280/166
See application file for complete search history.

(56) References Cited

U.S. PATENT DOCUMENTS

| 3,363,722 A | * | 1/1968 | Rimi ........................ 182/89 |
| 3,882,964 A | * | 5/1975 | Schellenberg ............. 182/69.4 |
| 4,708,355 A | * | 11/1987 | Tiede ........................ 280/166 |
| 5,154,125 A | * | 10/1992 | Renner et al. ............ 105/447 |
| 5,339,919 A | * | 8/1994 | Boyd ........................ 182/85 |
| 5,584,493 A | * | 12/1996 | Demski et al. ........... 280/166 |
| 6,068,277 A | * | 5/2000 | Magnussen ............... 280/166 |

* cited by examiner

*Primary Examiner*—Alvin Chin-Shue
(74) *Attorney, Agent, or Firm*—Cesari and McKenna, LLP; John F. McKenna

(57) ABSTRACT

An access device for providing access between a lower substrate surface and an upper substrate surface. The access device includes upper and lower articulated ladder members. A first end of the upper member is pivotally connected to or near the upper surface. A second end of the lower member is pivotally connected to the second end of the upper member, such that the lower ladder member is rotatable 180° relative to the upper member. In the storage position, the ladder members are folded in a substantially compact upright disposition, while, in the access position, the members are aligned and extend downwardly and outwardly.

3 Claims, 2 Drawing Sheets

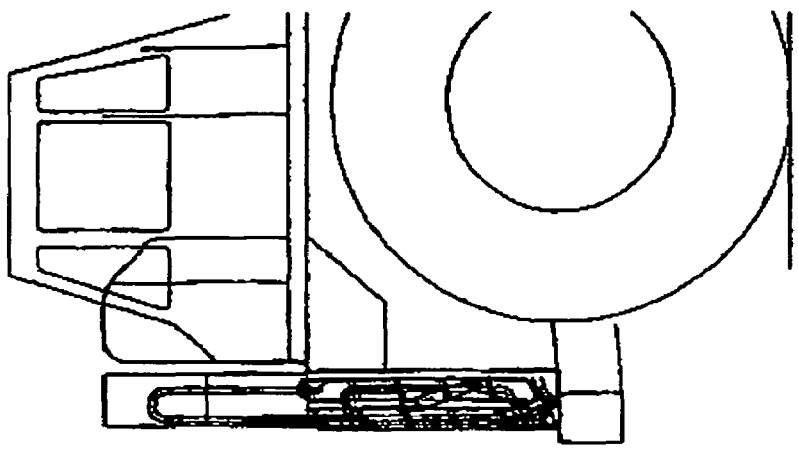
Figure 2(c)
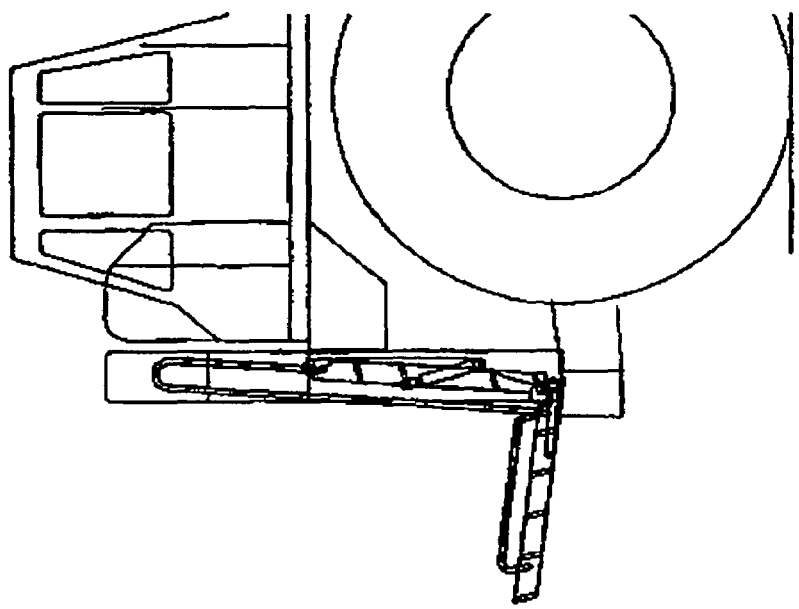
Figure 2(b)
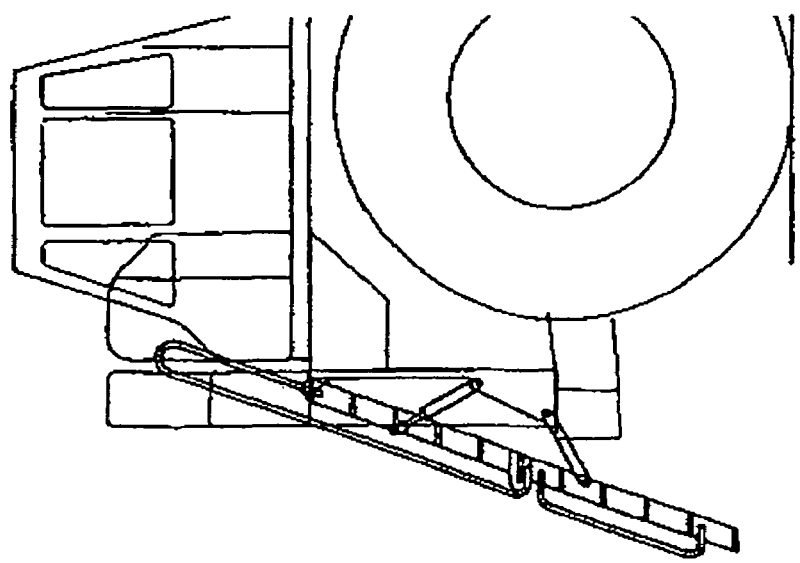
Figure 2(a)
Figure 2

ACCESS DEVICE

CROSS-REFERENCE TO RELATED APPLICATION

This application is a continuation of Ser. No. 10/315,331, filed Dec. 10, 2002, now abandoned, which is a continuation-in-part application of Ser. No. 09/513,730 filed Feb. 24, 2000, now abandoned.

BACKGROUND OF THE INVENTION

1. Field of Invention

The present invention relates to an access device, such as a ladder, which provides access between a substrate surface and an elevated surface. The present invention, in particular, relates to an access device which is particularly suitable for attachment to a locomotive, or other vehicle, where access may be required between a platform and a vehicle, and also between a lower substrate surface and the vehicle, and, whereby the access device is wholly retained such as not to protrude from the vehicle whilst the vehicle is in use.

2. Description of Prior Art

The reference to any prior art in this specification is not, and should not be taken as, an acknowledgement or any form of suggestion that that prior art forms part of the common general knowledge.

A variety of different access devices are presently known, to provide access between upper and lower surfaces. Various such devices are disclosed in granted and pending patent applications made by the Applicants, such as in the Applicants' earlier Australian patent application Nos. 67555/94 and 14992/97, and corresponding overseas applications.

For example, in the Applicants' earlier patent application No. 67555/94, the access device provides access between a substrate surface and an elevated surface of a vehicle, whereby the device is provided with a pair of rigid arms on each side of the access device, such that the device is pivotally movable from a stable lower position to a stable upper position. In the lower position, the access device is inclined at between 60° and 75° relative to a substantially horizontal substrate surface, with the upper end of the device in a position substantially adjacent to and forwardly of the elevated surface. In the upper position, that access device is provided substantially vertically or at a rearwardly inclined angle in a position which is totally upward and rearward of the elevated surface.

Also, in the Applicants' earlier patent application No. 14992/97, there is provided an access device which, instead of being stored upwardly and rearward of the elevated surface, the device is stored in a substantially horizontal position on the side or across the front of the vehicle. This is achieved by moving the device from the boarding to the storage position wherein, firstly, the device is rotated about a first axis, and secondly, the device is retracted such that the second end of the device is retracted towards the elevated surface.

While the Applicants' earlier access device embodiments provide significant advantages over the prior art devices, it will be appreciated that each of these devices is particularly designed to complement quite unique vehicles, wherein the functional uses of the particular vehicle limits the options for storage of the access device and, the different physical embodiments of the vehicles necessitate different designs of access devices for access between different surfaces.

SUMMARY OF THE INVENTION

The present invention seeks to provide an access device which may be used as an alternative to the aforementioned devices, and which overcomes certain disadvantages of prior art access devices in certain situations.

The present invention seeks to provide an access device which is conveniently located to be retained in an extremely compact manner behind the side extremities of a locomotive, or other like vehicle when in the folded position, but which extends substantially downwardly and outwardly when in the access position, at an angle which is easy for one to mount and dismount.

The present invention also seeks to provide a device which enables access from a lower surface which may be provided substantially lower in elevation to the underside of the vehicle, locomotive, or the like, that is, wherein there are design constraints in the attachment of the access device to the vehicle.

The present invention also seeks to provide an access device which, when in the folded position, allows access directly from a platform to the cabin, without impediment of the access device, but when in the storage position, is compact and does not impede the working movement of the vehicle in any manner.

In one broad form, the present invention provides a retractable access device for providing access between a substrate surface and an elevated surface of a vehicle such as a train, said access device comprising:

support means attached to or integral with a side surface of said vehicle;

a first ladder member pivotally connected at a first end thereof to said support means adjacent to said elevated surface of said vehicle;

a second ladder member pivotally connected at a first end thereof to a second end of said first ladder member;

a cylinder or like mechanism, a first end thereof being pivotally attached to said support means, and, a second end thereof being pivotally attached to said first ladder member spaced apart from said first end thereof;

a guide arm, a first end thereof being pivotally attached to said support means and a second end thereof being pivotally attached to said second ladder means at any position therealong;

whereby, said device is movable between a storage position and an access position in a single movement step, wherein as said cylinder is extended, said fist ladder member is pivoted outwardly from said vehicle, and, under the influence of said guide arm, said second ladder member is simultaneously rotated outwardly relative to said first ladder member, wherein, in a storage position, said ladder members are folded in a substantially upright disposition in a compact and overlapping manner adjacent said side surface of said vehicle, and, in an access position, said ladder members are aligned and outwardly inclined at an angle of between 60° and 75° relative to said substrate surface.

Preferably, each of said members includes at least one handrail.

Most preferably, in said access position, said ladder members are inclined at approximately 62° relative to said substrate surface.

BRIEF DESCRIPTION OF THE DRAWINGS

The present invention will become more fully understood from the following detailed description of preferred and novel embodiments thereof described in connection with the accompanied drawings, wherein:

FIG. 2 illustrates, in FIGS. 2a, 2b and 2c, the access device in accordance with the present invention adapted to the front of an earth moving or like vehicle, showing the lowered, half raised, and raised positions, respectively.

DESCRIPTION OF THE PREFERRED EMBODIMENTS

Throughout the drawings, like numerals will be used to identify similar features, except where expressly indicated otherwise.

As will be appreciated by persons skilled in the art, an access device attached to the side of a vehicle, such as a train locomotive, cannot protrude from the side extremities of the locomotive while the locomotive is in use. When the locomotive is adjacent to a platform, access must be provided directly from the platform onto the cabin area of the locomotive. When the locomotive is not adjacent to the platform, access must be provided by steps to a substrate surface. Due to the manner in which railways are constructed with tracks (and therefore the bottom of the locomotive) being raised relative to the substrate surface, the lower substrate surface from which access is ultimately required to be obtained, is often disposed substantially below the lower surface of the train or track level, and also substantially outwardly of the locomotive.

FIGS. 1 and 2 illustrate embodiments of an access device in accordance with the present invention, which overcome the problems of the prior art. FIG. 1 illustrates the device adapted to the side of a train locomotive, while FIG. 2 shows an alternative embodiment of the device adapted to the front side of an earth moving vehicle.

Throughout this specification and claims, when the term 'side' is used, it should be considered to encompass the usual 'sides' of a vehicle, but also, the front side and back side of the vehicle. The access device of the present invention is capable of being attached to any of these sides of the train or other vehicle.

Figure 1C:
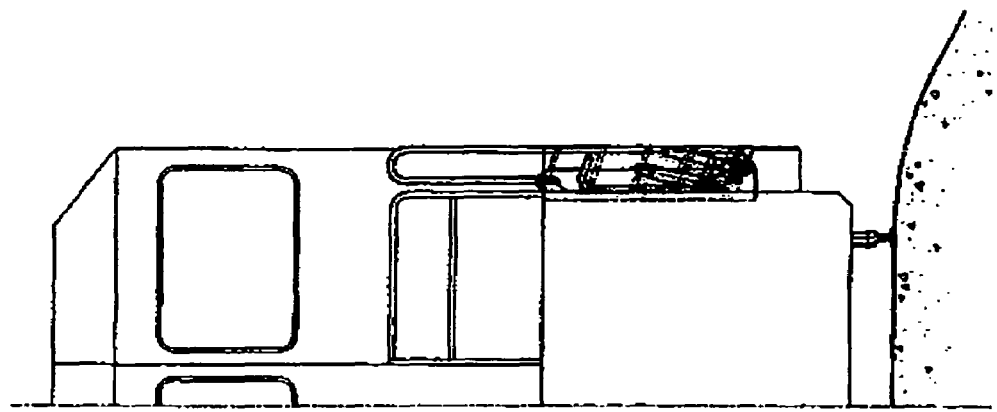
FIG. 1 illustrates, in FIG. 1a, FIG. 1b, and FIG. 1c, the access device in accordance with the present invention, showing the lowered, half raised, and raised positions, respectively of the device in accordance with the present invention adapted to the side of the locomotive.
Figure 1B:
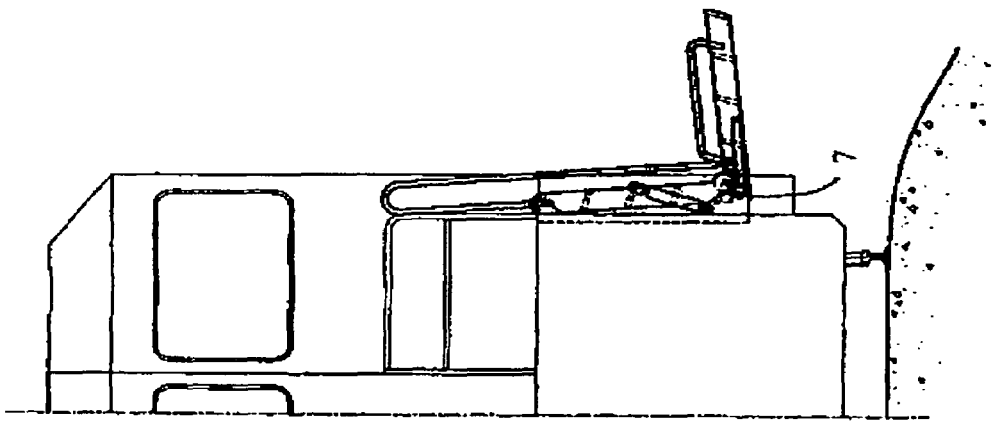
Figure 1A:
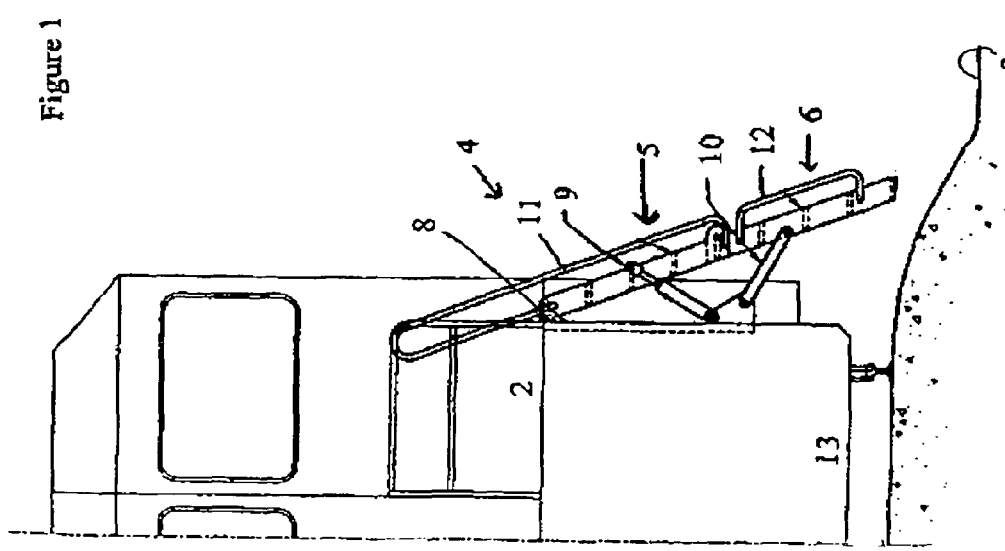

As illustrated in FIG. 1, the access device, generally designated by the numeral 4 is designed to provide access between lower (substrate) and upper (elevated) surfaces, 3 and 2 respectively. The access device 4 includes upper and lower ladder members 5 and 6, which are pivotally connected by pivot point 7 in a manner such that the upper and lower ladder members 5 and 6, respectively, articulate. The lower ladder member 6 is designed to be rotatable by 180° relative to the upper ladder member 5 such that it is completely folded in a compact and overlapping relationship with respect to the upper ladder member 5 when in the storage position as shown in FIG. 1(c). In the access position, the ladder members extend outwardly and downwardly, in end-abutting aligned relationship as shown in FIG. 1a. The access device 4 is attached to the vehicle by the upper end of the upper ladder member 5 being pivotally connected at pivot point 8 onto or adjacent to the upper surface 2, being affixed via a support means which may be attached to or formed integrally with the upper elevated surface 2. One or more actuators, such as a hydraulic or pneumatic cylinder or like device 9 effects movement of the device 4 in conjunction with a guide arm 10. An intermediate position of the device is illustrated in FIG. 1b.

The actuator, such as the cylinder or like mechanism 9, is seen to be attached to the support means at a position spaced apart from the pivot point 8, the other end of the actuator being attached to the first ladder member at a position spaced apart from the first end of the ladder member. The precise positioning of the actuator is variable, depending upon particular space requirements, etc. Obviously, the cylinder could be designed to be positioned such that the force required to operate the actuator is minimized for the particular installation. FIG. 1(a) shows the connection of the second end of the cylinder to a position substantially midway between the ends of the upper ladder member 5.

The guide arm 10 is likewise attached to the support means at a position lower than the cylinder, the other end of the guide arm being attached to the lower ladder member 6 at a position intermediate the two ends thereof. Likewise, the precise positioning of the guide arm to the second ladder member is variable, depending upon space requirements, angle of the ladder in the access position, etc. The guide arm is preferably a rigid member which merely guides the second ladder member in a 180° arc relative to the first ladder member automatically as the cylinder is operated to move the first ladder member outwardly.

It will be seen that, in use, on the side of a locomotive or other vehicle, in the raised position, the device 4 is fully retained in a compact and overlapping manner behind the side of the vehicle or locomotive when in the folded position, while in the access position, the device extends substantially downwardly and outwardly, preferably at between 60° and 75°, relative to the lower surface, as shown in FIG. 2a. In alternative applications, the access device is preferably angled at between 20° and 45°. As noted in various standards, such as Australian Standard AS 1657-1992 (access) access devices, the "insafe zone" is between 45° and 75°. Perhaps most preferably, in the access position, the ladder members are inclined at about 62° relative to the substrate surface.

The access device as shown in FIGS. 1 and 2 both illustrate the provision of a hand rail. The provision of a hand rail provides significant safety advantages when using the access device. It should be noted that the access device of the present invention has been designed such that it can incorporate a hand rail which also overcomes the drawback of the prior art in that the hand rail itself is also folded, together with the ladder members in a compact and overlapping manner, such that it does not protrude outwardly from the vehicle and, in a manner such that, in the access position, it is conveniently provided at a safe position in the access device 4, such that the access device can be mounted and demounted easily.

While the device shown in FIGS. 1 and 2 illustrate the use of one cylinder or like mechanism connected between the locomotive, vehicle and the upper member 5, other actuating members may be provided to effect similar operation. In the embodiment shown in FIGS. 1 and 2, one cylinder is provided, and a guide arm is additionally provided connected to the lower member 6 to guide the rotation of the lower member through its 180° movement. It will be appreciated that as the ladder is being folded, particularly as it is near in its closing position, such an arrangement may result in rapid rotation of the lower member. As such, a cam, gear, or the like may be used to control or limit the rotational movement of the lower member, as desired.

It will therefore be appreciated that with the provision of hand rails 11 and 12, access from a surface 3 which is substantially lower than the underside surface of the vehicle 13 may be provided, as easy hand access to the lower hand rail may be enabled. As such, the difficulties encountered by the prior art with the operator reaching the hand rail would be overcome.

It will be appreciated that numerous variations and modifications to the device will be envisaged to persons skilled in the art. Any such variations and modifications to the device in achieving the functional aspirations of the invention as hereinbefore described, should be considered all within the scope of the invention as hereinafter claimed.

What is claimed is:

1. A retractable access device providing access between a substrate surface and an elevated surface of a vehicle, said access device comprising:

a first ladder member having opposite first and second ends;

pivot means pivotally connecting the first end of the first ladder member to the vehicle so that said first end is substantially level with the elevated surface;

a second ladder member having a first end pivotally attached to the second end of the first ladder member, and a second end;

a linear actuator having first and second ends;

means pivotally connecting the first end of said actuator to the vehicle below the elevated surface;

means pivotally connecting the second end of the actuator to the first ladder member between the ends thereof;

a rigid guide member having a first end pivotally connected to the second ladder member between the ends thereof, and means pivotally connecting the second end of the guide member to the vehicle below said actuator whereby said device is moveable between a storage position and an access position in a single movement step, wherein as said actuator is extended, said first ladder member is pivoted outwardly from the vehicle and, under the influence of said guide member, said second ladder member is simultaneously rotated outwardly relative to the first ladder member so that said ladder members are aligned in outwardly inclined position at an angle of between 60° and 75° relative to the substrate surface with the second end of the second ladder member being located adjacent the substrate surface, and as said actuator is retracted, said first and second ladder members are folded in a substantially upright disposition in a compact and overlapping manner adjacent the vehicle.

2. The retractable access device as claimed in claim 1, wherein each of said ladder members includes at least one handrail.

3. The retractable access device as claimed in claim 1, wherein, in said access position, said ladder members are inclined at approximately 62° relative to said substrate surface.

* * * * *